May 28, 1957     S. CRAMER     2,793,528
AUTOMOBILE WIND DEFLECTOR WITH AIR SPEED INDICATOR
Filed Feb. 3, 1955     2 Sheets-Sheet 1
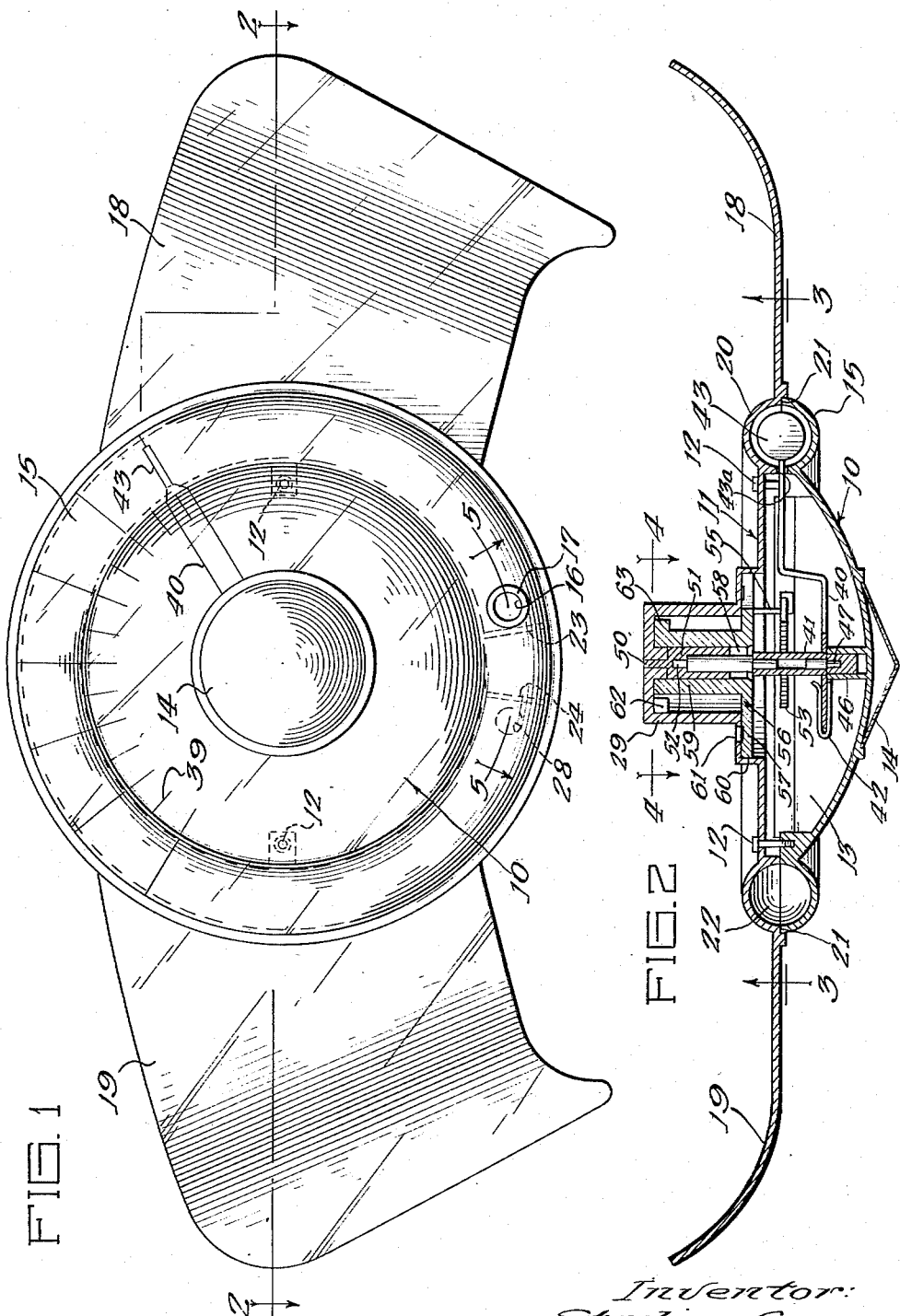
Inventor:
Sterling Cramer
By: Schroeder, Hofgren,
Brady & Wegner
Attorneys May 28, 1957 S. CRAMER 2,793,528
AUTOMOBILE WIND DEFLECTOR WITH AIR SPEED INDICATOR
Filed Feb. 3, 1955 2 Sheets-Sheet 2
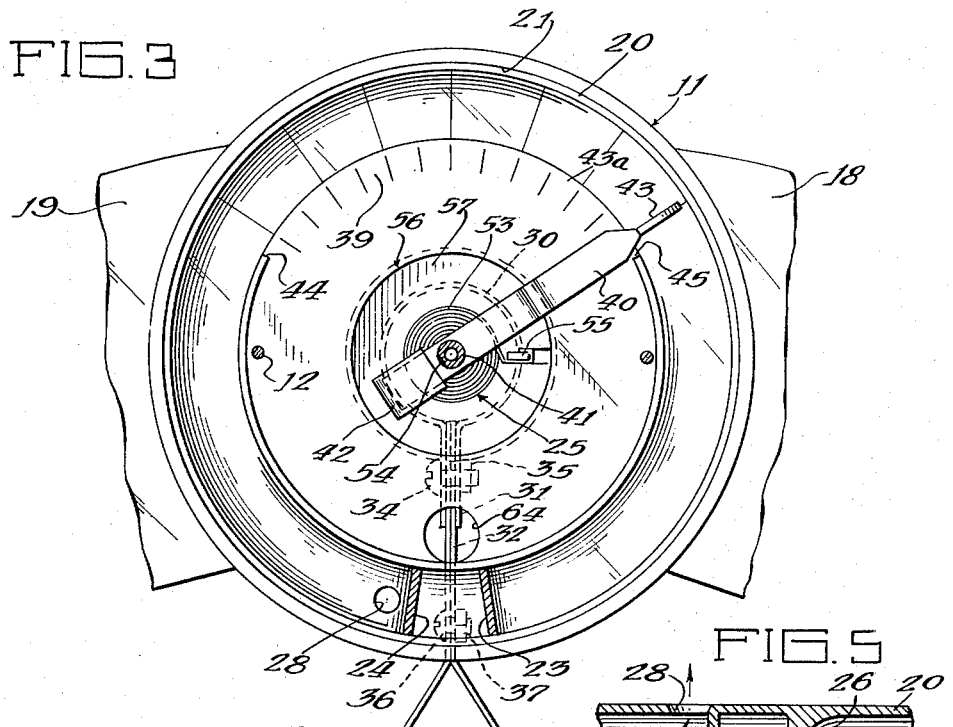
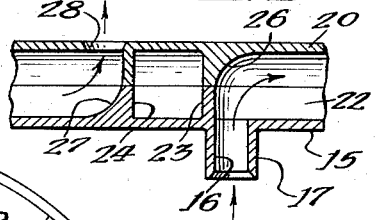
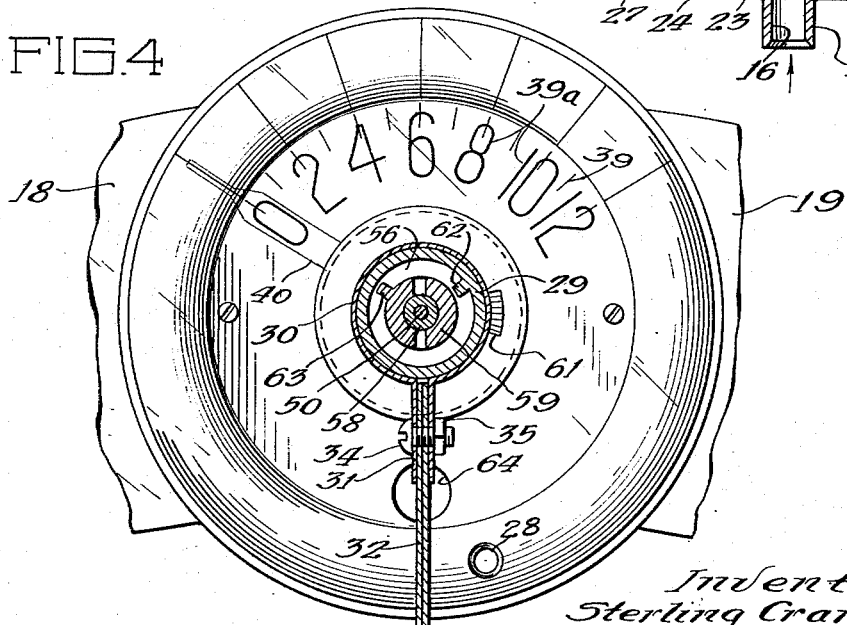
Inventor:
Sterling Cramer
By: Schroeder, Hofgren,
Brady & Wegner
Attorneys

2,793,528

AUTOMOBILE WIND DEFLECTOR WITH AIR SPEED INDICATOR

Sterling Cramer, Des Plaines, Ill., assignor to Sinko Mfg. & Tool Co., a corporation of Illinois Application February 3, 1955, Serial No. 485,962

5 Claims. (Cl. 73—186)

This invention relates to an air velocity indicator, and more particularly to an air velocity indicator which may be mounted in a bug deflector of an automobile.

The primary object of the present invention is to provide an automobile bug or snow deflector providing a direct visual indication to the driver of the velocity of the head wind encountered by the automobile.

Another object is to provide a wind deflector having an air speed indicating mechanism within it which is operative in response to the flow of air directed through a passageway in the deflector.

A further object is to provide a wind deflector having a spring-biased indicating mechanism which is adapted for adjustment to regulate the bias as desired.

Another object is to provide an air speed indicator for a wind deflector, the degree of movement of the indicator being directly proportional to the speed of air flowing through the air passage in the deflector.

The invention is illustrated in a preferred embodiment in the accompanying drawings, in which:

Fig. 1 is a front elevational view of the wind deflector;

Fig. 2 a sectional view taken as indicated on line 2—2 of Fig. 1;

Fig. 3, a fragmentary sectional view taken as indicated on line 3—3 of Fig. 2;

Fig. 4, a fragmentary sectional view taken as indicated on line 4—4 of Fig. 2; and Fig. 5, a fragmentary sectional view taken as indicated on line 5—5 of Fig. 1.

In the embodiment illustrated, the wind deflector includes a front deflector portion, generally designated 10, and a rear deflector portion, generally designated 11, which may be secured together by a pair of small cap screws 12 to form a chamber 13 within the wind deflector. The deflector is preferably molded in the desired form from a durable transparent plastic material, such as methacrylate which is highly resistant to normal weathering conditions and will not become clouded or discolored after prolonged use.

The front portion 10 may be generally convex in shape as viewed from the front of the deflector, and may have a decorative cap 14 secured to it by some suitable adhesive. The front deflector portion is preferably bounded by a integral circumferentially extending channel 15 which is provided with an inlet opening 16 through which incoming air is admitted to the wind deflector. The inlet opening 16 preferably has a forwardly projecting nipple 17 to prevent sudden side gusts of air from affecting the reading of the air speed indicating mechanism.

The rear deflector portion is provided with a pair of wing-like extensions 18 and 19 to assist in deflecting objects in the air away from an automobile windshield. An integral channel 20 having an outer annular seat 21 is also formed in the rear deflector portion 11 so that, when the two deflector portions are secured together, a snug mating fit is obtained between the two channels 15 and 20 to form a passageway 22 between them in the deflector. Preferably, however, the two channels, 15 and 20, are not fitted together in sealing engagement; thus water which may enter into the interior of the wind deflector through openings therein will be permitted to seep out between the mating portions of the two deflector portions, 10 and 11. Generally the amount of water entering the deflector is so small that it is eliminated by evaporation.

As can best be seen in Fig. 5, a pair of cooperating portions in each of the channels, 15 and 20, may be provided to form a pair of end walls, 23 and 24, and a pair of baffles, 26 and 27, to effectively block opposite ends of the air passageway 22. The baffle 26 is generally positioned to deflect air entering through the inlet 16 into the passageway 22, and the baffle 27 may be positioned near the opposite end of the passageway 22 to deflect the air outwardly through an outlet 28 in the channel 20 of the rear deflector portion 11.

Referring to Figs. 2 and 4, the rear deflector portion 11 is also preferably provided with a hollow, rearwardly extending, cylindrical shank 29 which is embraced by a band 30 having downwardly extending arms 31. The arms 31 are secured to the upwardly extending arms 32 of a pair of opposed clamping jaws by a bolt 34 and a nut 35. By tightening the nut 35 upon the bolt 34, the band 30 is firmly held upon the shank 29. The deflector is secured to an automobile hood by the clamping jaws 33 which are drawn together to grip the central molding on the hood by a bolt 36 and a nut 37 on the upwardly extending arms 32.

The wind deflector is provided with an air speed indicating mechanism, generally designated 25, which is positioned in the chamber 13 between the front and rear deflector portions and has a member movable in response to air passing through the passageway 22 in the deflector. A scale 39 is preferably provided in or on the transparent rear deflector portion 11 so that a person may view the scale and indicating mechanism from the rear and ascertain the approximate air speed.

The indicating mechanism includes a needle 40 secured to a pivot shaft 41 and preferably having a counterbalancing portion 42 at one end and a paddle-shaped end portion or vane 43 at the opposite end. The end portion 43 is generally of a size slightly smaller than a section taken through the passageway 22, as shown in Fig. 2, and it may be shaped like a tear drop, if desired. A cut-away portion 43a is preferably provided in the channel 20 of the rear deflector portion 11 to allow the needle 40 to move across the scale 39, and the opposite ends of the cut-away portion generally are formed into shoulders 44 and 45 which serve as abutting surfaces to limit the angular movement of the needle 40 in either direction.

A bearing surface is provided for the pivot shaft 41 in each of the deflector portions, 10 and 11, to permit the needle 40 to be pivoted across the deflector scale 39. In the front deflector portion 10, and as best seen in Fig. 2, a centrally disposed, rearwardly extending projection 46 is countersunk to provide an inner bearing surface for a journal 47 of the pivot shaft 41.

In the rear deflector portion 11, a bearing 51 is provided for a journal 52 on the other end of the pivot shaft 41. The bearing 51 may be maintained in fixed position by a rearwardly extending stem 50, integral with the bearing 51, which is preferably frictionally held within a hollow, forwardly extending support member 48 in the well of the hollow shank 29.

In order to tension the paddle-shaped end portion 43 of the needle 40 against the force of air passing through the passageway 22, a hairspring 53 may be provided which encircles the pivot shaft 41 and is secured at its inner end to a flattened portion 54 on the pivot shaft 41. The outer end of the hairspring 53 is preferably secured to a lug 55 forwardly struck from a rotatable member, generally designated 56.

The rotatable member 56 includes preferably a rounded plate 57 having a central opening 58 and a pair of rearwardly extending spring fingers or clamping jaws 59. The size of the opening 58 and the spacing of the spring fingers 59 are such that the rotatable member 56 will not interfere with the operation of the pivot shaft 41. When the plate is pressed rearwardly into a seat 60 in the rear deflector portion 11, the rearward tips of the two spring fingers 59 snap into frictional engagement about the outer surface of the support member 48 in the well of the hollow shank 29. This frictional engagement is such that the rotatable member 56 will remain immobile even though a force is exerted upon it by the hairspring 53 attached to the lug 55.

Provision is made for rotating the member 56 to apply additional tension upon the hairspring 53 so as to adjust the initial position of the needle 40 with respect to the scale 39. The rearward face of the plate 57 is preferably notched, as can be seen in Fig. 4, and the notches are exposed rearwardly through a slot 61 in the rear deflector portion. By inserting a pointed instrument through the slot 61, successive notches may be engaged and the rotatable member 56 may be turned in the desired direction.

To ensure that the hairspring 53 will not be subjected to excessive tensioning by the turning of the rotatable member 56, a shoulder 62 is formed in the well of the shank 29 to engage a cooperating stud 63 formed near the free end of one of the spring fingers 59 so that rotation of the rotatable member is restricted to less than 360°.

It is clear that for a given air speed, the amount of deflection of the needle 40 of the indicating mechanism 25 may vary considerably depending upon several factors, such as the shape and size of the paddle-shaped end portion 43, the strength of the hairspring 53, the friction in the pivot shaft 41, the rapidity with which air is permitted to escape from the deflector, and the weight of the movable portions of the indicating mechanism. Each of these factors may be standardized for a particular wind deflector, and a scale for the indicating mechanism may be calibrated by applying a given air speed to the indicating mechanism and marking the amount of needle deflection from its rest or initial position. This operation may be repeated throughout the range of air speeds in which the wind deflector will normally be used to form a scale which is calibrated to the particular structure of the indicating mechanism used.

It is preferred that the wind deflector be constructed so that the needle 40 of the indicating mechanism 25 will have a pivotal movement directly proportional to the speed of air flowing in the passageway 22. The scale 39 can then be graduated in a uniform manner by numerals 39a, as indicated in Fig. 4 in which each graduation corresponds to twenty miles per hour.

To this end two factors are carefully regulated. A hairspring 53 is employed which will be tensioned uniformly substantially in direct proportion to the force applied to the end portion 43 of the needle 40; and the rapidity with which air is permitted to escape from the deflector is regulated to maintain a proper amount of back pressure within the deflector. The needle 40 will balance at any particular graduation on the scale 39 when the force exerted by the incoming air upon the end portion 43 is balanced by the sum of the forces of the tensioned hairspring 53 and the back pressure of the air within the deflector.

The correct back pressure in the present embodiment was assured by providing an air escape outlet 64 of the proper size in the rear deflector portion 11 so that there is a continuous outflowing of air from the central chamber 13. In determining the proper size for the outlet 64, it was found that too small an opening restricted needle movement too much, especially at the lower air speeds, and too large an opening reduced the back pressure so that gross needle movement occurred even at very low air speeds. The outlet size was varied between the two extremes until deflection readings of the needle 40 were obtained which were within the desired operating range of air speeds, and which were directly proportional to the speed of air passing through the deflector. If any one of the elements comprising the indicating mechanism 25 is changed, the size of the opening can be determined again by the usual test procedures.

Although not shown in the drawings, it is contemplated by the present invention that illuminating means for the scale 39 and the needle 40 may be provided, or that a luminous material may be coated on the scale and indicating needle so that the air speed may be ascertained during darkness.

To place the wind deflector in operation, the needle 40 is first adjusted to its initial position on the right edge of the scale 39, as viewed in Fig. 1. This is done by turning the rotatable member 56 to tension the hairspring 53 and move the needle 40, as desired. The bolt 37 is then loosened from the nut 36, and the clamping jaws 33 are spread apart to embrace the central molding on the hood of the automobile. The deflector is secured in upright position by retightening the nut 37 upon the bolt 36. When the car is in movement forwardly, some of the air encountered enters the passageway 22 through the inlet 16. The movement of this air through the passageway 22 deflects the end portion 43 of the needle 40 against the action of the hairspring 58. The air speed can be read directly from the scale 39 by viewing the position of the needle 40 in relation to the scale 39.

The foregoing detailed description is given for clearness of understanding only and no unnecessary limitations should be understood therefrom, for some modifications will be obvious to those skilled in the art.

I claim:

1. An air velocity indicator for automobiles, comprising: a front body portion and a rear body portion secured together to provide an inner hollow chamber and an outer annular passageway for air between the two body portions, the passageway having an inlet for air in the front body portion and an outlet for air in the rear body portion and being provided with a slotted opening connecting the interiors of said passageway and hollow portion; a needle position within said hollow chamber to indicate speed of air flow, said needle being pivoted between the two body portions and having an end portion projecting through said slotted opening into the passageway, said end porton being movable in response to air flowing in the passageway; a spring member secured to said needle normally to urge said needle in a direction opposing the air passing through the passageway; and support means for securing the indicator in upright position.

2. An air velocity indicator as specified in claim 1, in which baffle means are provided in the passageway between the air inlet and air outlet to define opposite ends of said passageway, said baffle means being shaped to deflect air flow into and out of said passageway.

3. An air velocity indicator as specified in claim 1, in which the spring member is a hairspring and a rotatable member is mounted on the inner surface of one of the body portions, one end of the hairspring being secured to the needle and the other end being secured to said rotatable member, the rear body portion being provided with and aperture to expose said rotatable member whereby turning of said rotatable member will regulate the tension of the hairspring.

4. An air velocity indicator as specified in claim 1, in which the inlet in the front body portion faces forwardly and the indicating needle pivots in a plane substantially at right angles to the air flow entering said forwardly facing inlet, the rear body portion being of transparent material to permit said indicating needle to be viewed from the rear.

5. An air velocity indicator for automobiles, comprising: a front body portion and a rear body portion secured together to provide an inner hollow chamber and an outer annular passageway for air between the two body portions, the passageway having a slotted opening connecting said passageway to the chamber; a forwardly opening air inlet for the passageway; a rearwardly opening air outlet for the passageway; a needle pivoted between the two body portions and having an end portion projecting through said slotted opening into the passageway, said end portion being movable in response to air flowing in the passageway, a spring member secured to one of the body portions and to said needle to uniformly tension said needle in a direction opposing the air flow in the passageway; and a rearwardly exhausting air aperture in the rear body portion to permit escape of air from the hollow chamber, said aperture being of a size to relieve the build-up of back pressure of air entering the hollow chamber from the passageway through the slotted opening so that the deflection of said needle will be substantially proportional to the speed of air flowing in the passageway.

References Cited in the file of this patent

UNITED STATES PATENTS

| 1,162,366 | Jensen | Nov. 30, 1915 |
| 1,221,726 | Hamill | Apr. 3, 1917 |
| 1,819,138 | Trogner | Aug. 18, 1931 |

FOREIGN PATENTS

| 245 | Great Britain | Jan. 7, 1915 |
| 846,506 | France | June 12, 1939 |
| 512,330 | Great Britain | Sept. 1, 1939 |